Nov. 14, 1967

F. C. BEILFUSS 3,353,173

MULTIPLE SIGNAL MODULE HOTEL CALL SYSTEM

Filed Sept. 9, 1964

5 Sheets-Sheet 1

INVENTOR.
FREEMAN C. BEILFUSS

BY Price & Heneveld

ATTORNEYS

Nov. 14, 1967 F. C. BEILFUSS 3,353,173

MULTIPLE SIGNAL MODULE HOTEL CALL SYSTEM

Filed Sept. 9, 1964 5 Sheets-Sheet 2

INVENTOR.
FREEMAN C. BEILFUSS

BY Price & Heneveld

ATTORNEYS

Nov. 14, 1967 F. C. BEILFUSS 3,353,173

MULTIPLE SIGNAL MODULE HOTEL CALL SYSTEM

Filed Sept. 9, 1964

5 Sheets-Sheet 3

INVENTOR.
FREEMAN C. BEILFUSS

BY Price & Heneveld

ATTORNEYS

Nov. 14, 1967 F. C. BEILFUSS 3,353,173

MULTIPLE SIGNAL MODULE HOTEL CALL SYSTEM

Filed Sept. 9, 1964

5 Sheets-Sheet 4

INVENTOR.
FREEMAN C. BEILFUSS
BY Price & Heneveld
ATTORNEYS

Nov. 14, 1967 F. C. BEILFUSS 3,353,173

MULTIPLE SIGNAL MODULE HOTEL CALL SYSTEM

Filed Sept. 9, 1964 5 Sheets-Sheet 5

INVENTOR.
FREEMAN C. BEILFUSS

BY Price & Heneveld

ATTORNEYS

United States Patent Office 3,353,173
Patented Nov. 14, 1967

3,353,173
MULTIPLE SIGNAL MODULE HOTEL CALL SYSTEM

Freeman C. Beilfuss, Wyoming, Mich., assignor to Call-Boy Systems, Inc., Wyoming, Mich., a corporation of Michigan Filed Sept. 9, 1964, Ser. No. 395,271
10 Claims. (Cl. 340—286)

This invention relates to a communication system for hostelries, and more particularly to a communication system enabling complete status control by the desk clerk of a hostelry with a compact, versatile assembly with interchangeable modules.

This invention is an improvement of my basic concept set forth in copending application entitled Call System For Hostelries, Ser. No. 173,300, filed Feb. 14, 1962, now U. S. Patent No. 3,245,070.

The size and complexity of hostelries causes mechanism intended for status control to be complex, space consuming, and cumbersome to use. Ordinarily a multiple of devices and systems is necessary for various purposes. As examples, to call guests at set times, to warn guests of fire, to leave messages for guests, to be informed of the occupied status of each room, to inform maids and housekeepers of cleaning services needed for each room, to know of the status of television sets, to refer to records of guests' names, etc., presently requires a variety of arrangements employing bellboys, telephone operators, switchboards, card files, alarm networks, etc., and even then the carefully worked out "systems" often fail.

In fact, not only are these status systems extremely cumbersome in large hotels, but also smaller hotels or motels often cannot intermesh such apparatus into their moderate size operations. This results in either poor service or extensive personal attention by the manager or desk clerk.

The installation of a master control electrical system in itself can cause maintenance difficulties, however, since the hotel management normally has little if any knowledge regarding such equipment.

It is therefore, an object of ths invention to provide a structurally simplified, compact, functionally integrated, versatile hostelry communication system that enables the desk clerk to maintain complete control of the hostelry room status, yet using a relatively small amount of space adjacent the main desk.

Another object of this invention is to provide a module type control and status system enabling replacement of defective electronic components simply and quickly by a person with no special skills. Moreover, if malfunctioning occurs with respect to the apparatus for a particular room, only one replacement need be made.

It is an object of this invention to provide such a system which automatically communicates to the main desk from the rooms, and vice versa, to simplify and streamline the hostelry system, thereby enabling the main desk clerk to keep control of the situation. It enables the desk clerk and housekeeper to instantly know the status of the rooms, whether clean, or needing immediate cleaning, or occupied. It indicates constantly to the desk clerk or the housekeeper the status of these rooms at a glance, requiring only a fraction of a second. Yet, the system is relatively automatic and readily used with only slight training.

It is another object of this invention to provide a hostelry signaling and communication system that achieves awakening and fire warning in combination, that does so with relatively inexpensive equipment, and with each room being independent of the other rooms.

It is another object of this invention to provide a hostelry signaling and communication system that indicates the presence or absence of a television set in each particular room. The clerk can tell this at a glance in a fraction of a second. He is not dependent upon a repair man or a bellboy to inform him of removal from any one or more rooms for repair. The system informs the clerk of an attempted theft of a television set from any particular room so that he can take necesary steps to prevent it.

It is another object of this invention to provide a control system for hostelries where the apparatus at the main desk is compact, consuming far less space than conventional card racks which achieve only a fraction of the results of this system. Furthermore, it greatly simplifies the conventional card system where all of the data must be written in detail on small cards and used one at a time. Rather, the clerk can tell at a glance the status of the entire grouping of rooms. He further can control the system with the turn of a switch.

It is another object of this invention to provide an electrical control and signaling system for hostelries where the small data slips containing the names of room guests and room prices are contained adjacent the respective control panel modules for each room. Therefore, they are convenient to use as well as assuming no extra space.

It is another object of this invention to provide an electrical hostelry control and signaling system not only automatically responsive to the individual status of each room, but where even the electrical control units for each room are completely independent modules. Each module blends smoothly with adjacent modules to cooperatively form a complete indicating and seignaling system at the desk. Yet, each can be individually removed from the other modules to be unplugged, and substituted by another like module. Thus, the modules can be mass-produced to be interchangeable, as necesary. Consequently, the keeping of a few spare modules completely eliminates the possibility of breakdown of the entire system since only a second or two is required to replace a module which is malfunctioning. The malfunctioning module can then be taken to some other location for convenient repairs as necessary. Moreover, the substitution can be made by one unskilled in electrical matters. Moreover, each module includes its own power supply and other functional electrical components needing periodic replacement. Therefore, if malfunctioning does occur, it occurs in the modules which are so readily removable and replaceable by substitutes. Hence, malfunctioning of electrical components does not require major repair by an expert of the wiring system throughout the hotel, but merely a quick substitution by one having relatively little skill.

Another object of this invention is to provide a non-verbal hostelry communication system requiring only moments of one person's time to relay information, and enabling the information to continue to be transmitted to another person.

Still another object of this invention is to provide a non-verbal hostelry communication system not requiring any audio speakers in the room, which speakers are subject to being "tapped."

A further object of this invention is to provide such a system that prevents a desk clerk from renting a room the second time, accidentally or purposely, without someone actually physically checking the room.

These and several other objects of this invention will become apparent upon studying the following specification in conjunction with the drawings in which.

The inventive system has a main control assembly at the main desk in the hostelry, an indicator panel unit in the housekeeper's room, and a plurality of individual indicator panel units in the individual rooms of the hostelry. For convenience, only one of these rooms panels is illustrated, with the others being identical thereto and associated with the housekeeping panel and one module of the main desk card console in the same fashion.

At the main desk, the console 10 includes a receiving cabinet and a plurality of individual, independent modules 14. These modules when interfitted not only provide individual electrical control of the room panels, but also effect a card rack by their unique interfitting action. Each module (FIG. 2) is essentially a self-contained unit which can be plugged into the main cabinet or removed therefrom as necessary. Each is independent electrically from the other modules to control one specific room.

Figures 2, 3:
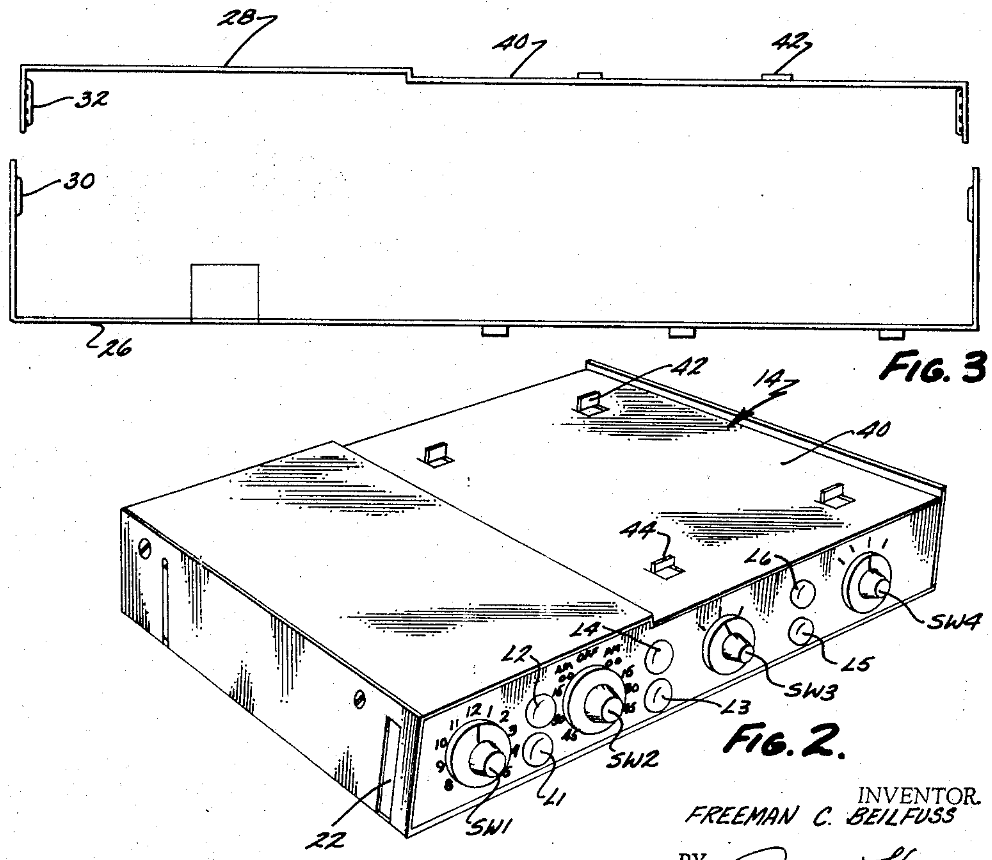
FIG. 2 is an enlarged perspective view of one of the modules in the console in FIG. 1, for controlling one particular room in the hostelry.
FIG. 3 is an elevational exploded view of the two major housing shell components telecopically interengageable to form the module housing in FIG. 2.

Each module may have a variety of components thereon. Normally, when the system is installed, all of the rooms are outfitted in similar fashion with the same number of operative components. Basically, there are four rotary switch knobs and switches on each module, and a plurality of indicator lights. Referring to FIG. 2, switches SW1 and SW2 comprise the time control switch mechanism for awakening a guest. Between these two switch knobs is a pair of indicator lights, with the first indicator light L1 cooperating with the awakening system in a manner to be described, and a second indicator light L2 being a fire signal means integrally associated with the system. The third switch SW3 is usually a message indicator control and has a cooperative indicator light L3. Light L4 indicates the presence or absence of a television set in the respective room.

Switch SW4 controls the room status signal means, and is correlated with two indicator lights L5 and L6. Indicator light L5 shows the desk clerk whether the room has been cleaned or not, in a manner to be described. Indicator light L6 shows the desk clerk whether the room is occupied.

Figure 4:
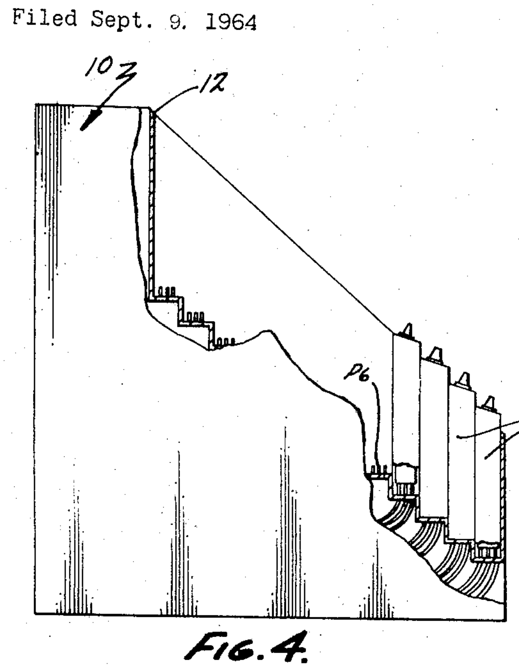
FIG. 4 is a side elevational view of the console in FIG. 1, shown partially cut-away.

These switch knobs are mounted on the front narrow elongated face plate 20 of the module housing. This face plate has indicia numerals thereon for the hour switch SW1 and the minute switch SW2. It is secured in the housing by having its ends 22 protrude through slots in the side walls of the housing. The housing is preferably formed of a pair of telescopically interfitting sheet metal shell elements 26 and 28 (FIG. 3). These include male embossments 30 and female receiving sockets 32 to snap the two units together. The housing is substantially rectangular in each of its dimensions when assembled, to allow sliding interfit of a plurality of the modules in the manner illustrated in FIG. 4. If the number of rooms in the hostelry is less than the space provided in the end card rack cabinet 12, a plurality of blank modules 14' are inserted as necessary to complete the assembly.

When the modules are interfitted one upon the other, the female plug sockets P*a* at the rear of each module are slidably plugged electrically over the fixed male plug connectors P*b* protruding in the housing. The modules can be slidably inserted and removed, or replaced by equivalent modules, without necessitating use of special tools, and with complete ease.

The top of each module includes a recessed portion which defines an elongated, shallow depression 40. This depression, when fitted against the under surface of the adjacent module thereabove, forms a card receiving slot for the conventional room cards kept by a clerk for each room. The slots slant inwardly-downwardly to retain the cards or slips. Consequently, the construction provides control and signal means for the room, and also is a complete self-contained status mechanism. This enables the clerk to keep track of the guests' names, payment or lack of payment, and the number of nights the guest stays in the room. To prevent the cards from sliding irretrievable into the slots, a pair of deformed tabs 42 are die-cut into the top and project upwardly into this depression (FIG. 2) to serve as stop means. Alternatively, a second set of tabs 44 spaced closer to the front panel of the module, can be deformed if the particular hotel utilizes short slips as some do.

Figures 6, 9:
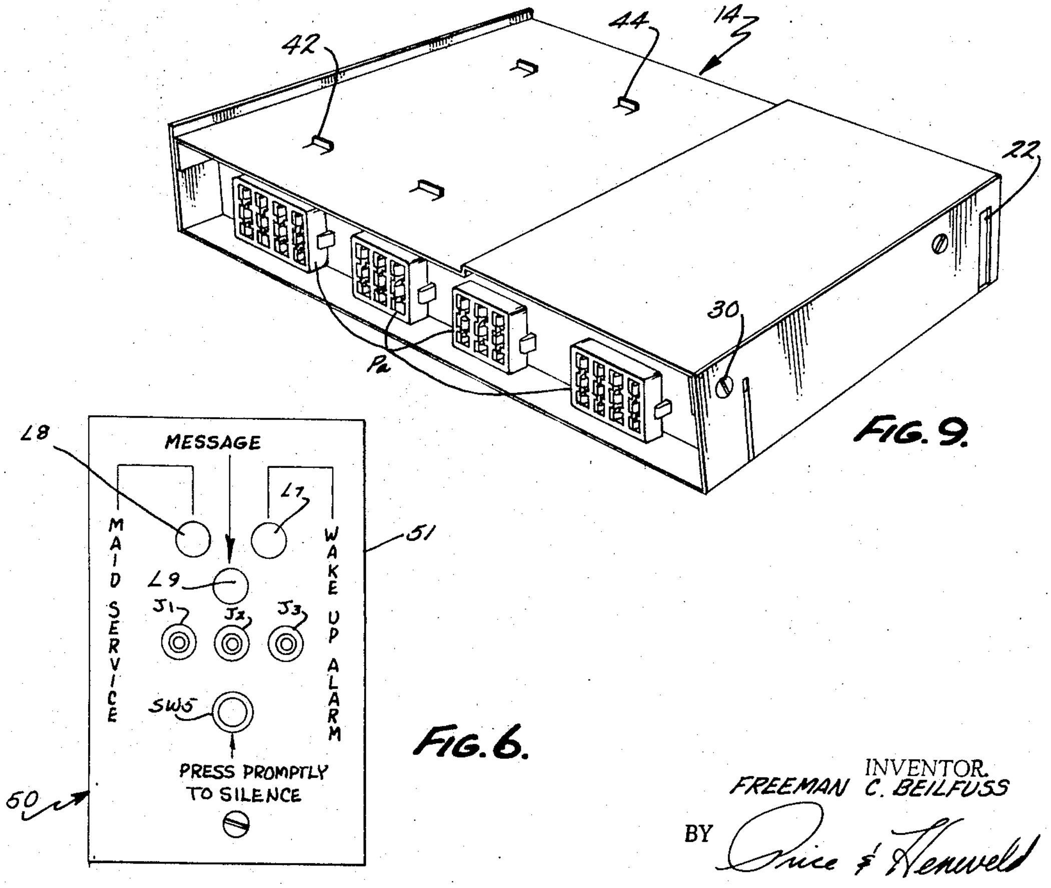
FIG. 6 is an elevational view of the room panel in each of the rooms and forming part of the integrated system.
FIG. 9 is a perspective enlarged view of the individual module in FIG. 2 showing the backside thereof with its plug sockets.
Figures 10, 11:
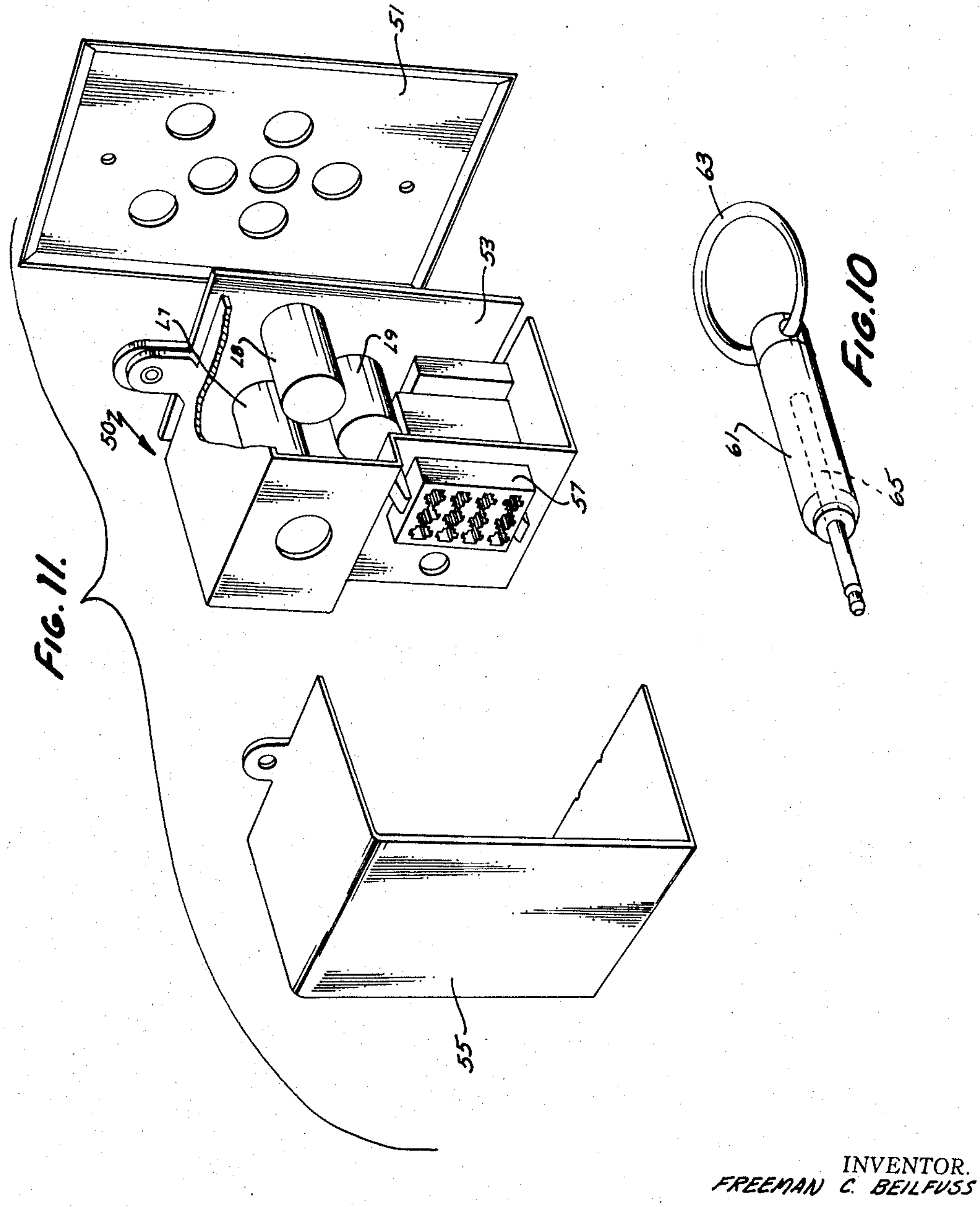
FIG. 10 is a perspective view of the jack plug forming part of this system.
FIG. 11 is a perspective exploded view of the room panel unit.

In each of the individual rooms of the hostelry is a room panel unit like that illustrated in FIGS. 6 and 11. This room unit 50 comprises an escutcheon plate 51 attached by screws 52 over a socket box 53 equivalent to a standard light box and recessed in the wall in a sheath 55. It houses a wake-up indicator light L7, a maid service indicator light L8, a message indicator light L9, a release switch button for switch SW5, and a plurality of three jacks J1, J2 and J3. The entire box and components may be plugged in and removed because of the plug connection 57.

Figure 5:
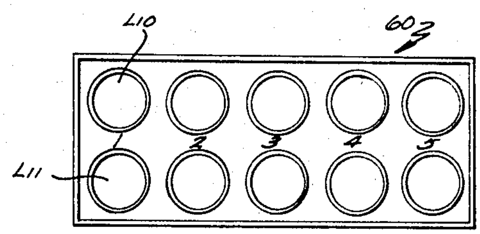
FIG. 5 is an elevational view of a housekeeping panel indicator forming part of the integrated system herein.

In the housekeeper's room is a general room status panel 60 (FIG. 5) having two indicator lights L10 and L11 for each room. Sufficient lights are shown in FIG. 5 for five rooms, numbered from 1 to 5, merely as an example. This panel is mounted in a convenient place so the housekeeper can keep track of the cleaned or uncleaned status of the rooms. Preferably, the indicator lights are of different colors, as are the indicator lights on the modules at the desk panel.

Operably controlling the wake-up system for the control assembly is an electrical clock switching arrangement including a master clock for all of the individual rooms to electrically control room awakening indicators in response to settings of individual switches SW1 and SW2 on each module.

Figure 7:
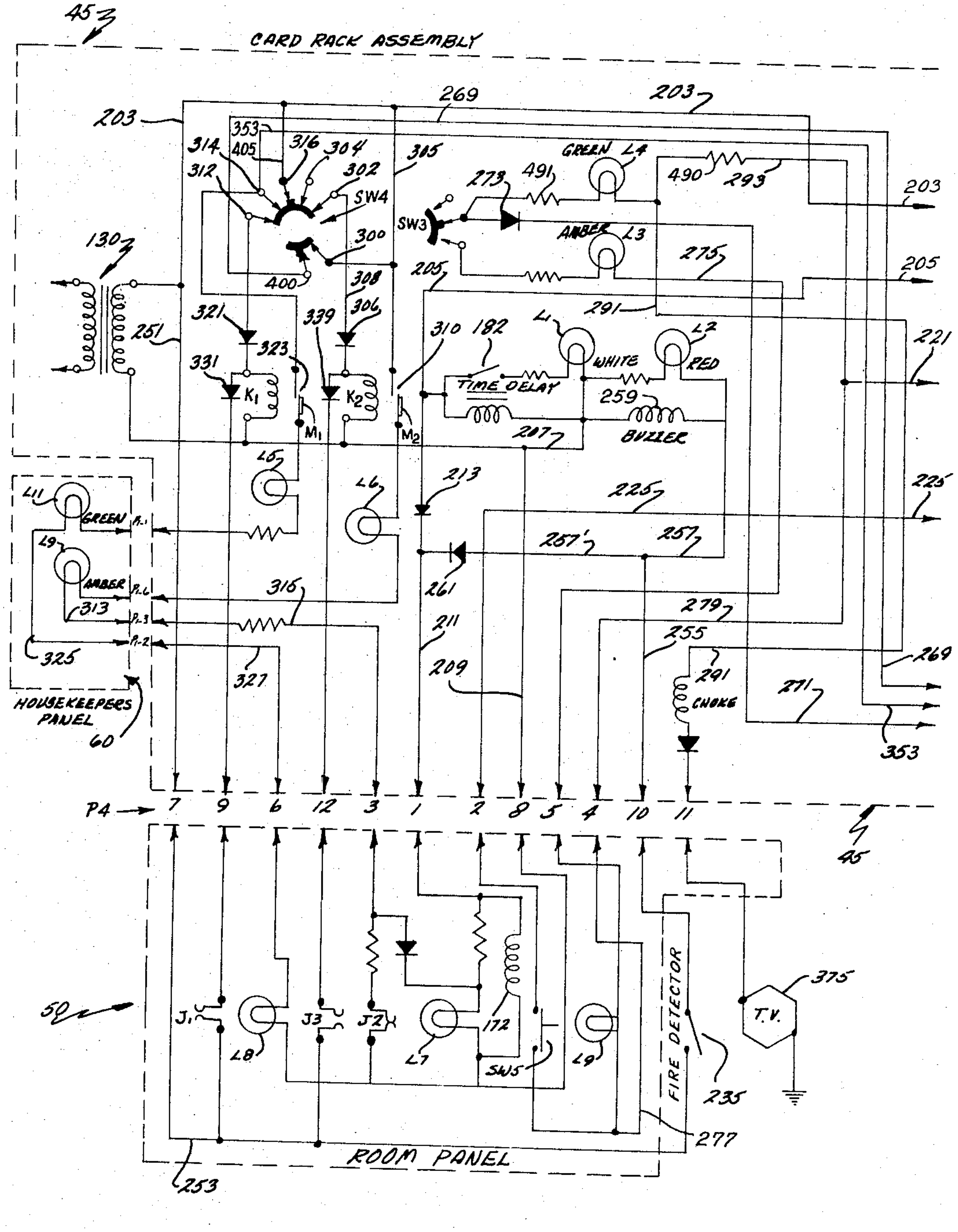
FIG. 7 is a schematic partial circuit diagram of the components of this system.

The complete circuitry illustrated in FIG. 7 illustrates chiefly one complete room panel assembly 50, a housekeeper's panel assembly 60, one complete individual module assembly 45, a flasher assembly 140, and a program clock assembly 49. For convenience, these respective portions are outlined in dotted lines. The assemblies are interconnected by plugs P1, P2, P3 and P4. In a complete installed system, it will be understood that the number of room panels and the number of modules will be the same as the number of rooms to be equipped with the novel system. Each is integrated in the same manner as that shown and described. One housekeeper's panel is used, when installed, with two lights for each room. In the installed system, there is one flasher assembly 140, and one master clock assembly 49. A power supply transformer 130 is provided in each module. A power supply transformer 131 operates the program clock and switching mechanism. The flasher motor is operated directly from the AC source, while its contacts in the control circuitry are powered from transformer 131 through lead 171.

Basically, the apparatus integrates an awakening system, a fire alarm system, a message light indicator system, a room status system, and a room television status system.

Figure 8:
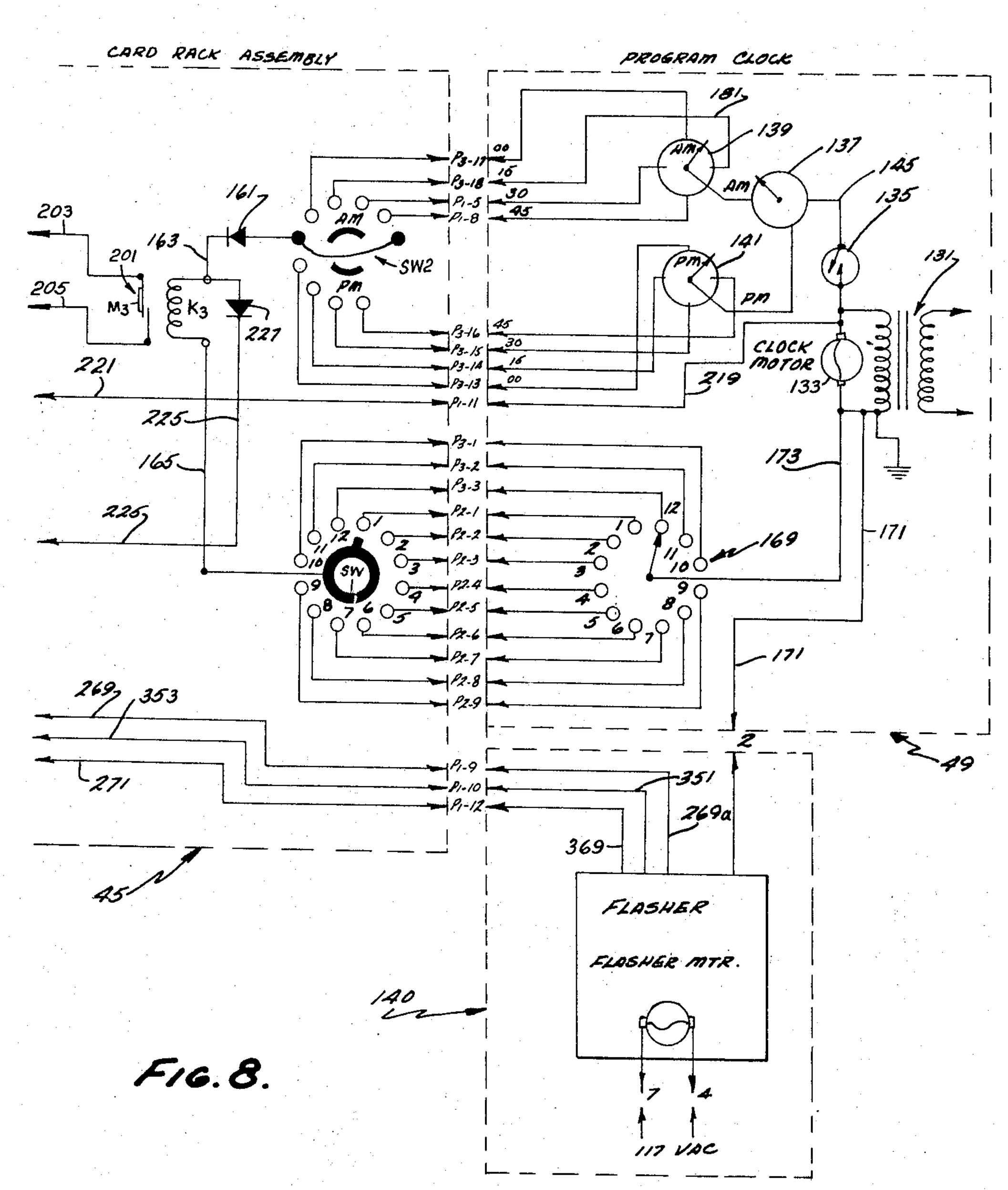
FIG. 8 is the second cooperative schematic partial circuit diagram supplementary to FIG. 7.

These are all combined in the same electrical system in the novel manner illustrated in FIGS. 7 and 8 and described hereinafter.

The awakening system includes program clock assembly 49, room panel light L7, and buzzer 172, room panel release button switch SW5, time delay switching assembly 182 in the control panel module, control panel indicator light L1 and the interconnecting wire leads therebetween.

The program clock assembly 49, powered from transformer 131, includes a clock motor 133 which continuously operates the clock and also drives a series of rotational dial switches. These switches include switch 135 having a sweep of four revolutions per hour and constituting a two second impulse switch. Switch 137 has a sweep of one revolution per day. Switch 139 is an a.m. switch and has a sweep of one revolution per hour. Switch 141 is a p.m. switch and has a sweep of one revolution per hour. Switch 135 is in electrical series with the remaining components of the assembly so that the switch circuit can be closed for two second impulses under the proper conditions to actuate a reed relay assembly K3 in a manner to be described. Relay assemblies K1, K2, and K3 are of the well-known type which when a pulse of current flows in one direction through the coil of the relay, the contacts will be closed and held closed even after current flow is stopped; however, when current flows in the opposite direction the contacts are immediately opened. This is accomplished by magnets M1, M2, and M3 associated with the reeds of each relay which when flux created by the coil flows in one direction initiates the closing which is maintained by the magnet but when flux created by the coil flows in the opposite direction the magnet loses its power to hold the contacts closed.

Switch 137 includes two semi-circular fixed contacts which cooperate with the rotating switch arm connected from lead 145. One of the semi-circular contacts is in electrical series with the a.m. switch assembly 139, and the other is in series with the p.m. switch assembly 141. Switch assembly 139 includes a plurality of four fixed contacts placed 90 degrees apart, and cooperative with its sweep hand contact to complete the circuit through this unit at 15 minute intervals. Likewise, switch assembly 141 does the same. Control switch SW2 includes a center rotational contact dial which cooperates with selective fixed contacts around its periphery. Four of the contacts electrically interconnect with the 0, 15, 30 and 45 minute interval contacts on switch assembly 139. Four additional contacts interconnect electrically with the 0, 15, 30 and 45 minute interval contacts on switch assembly 141. The remaining two fixed contacts of switch SW2 are common and are electrically bridged. These common contacts are connected through a rectifier 161 and lead 163 to the coil of relay K3, from thence to lead 165, to control switch SW1.

Control switch SW1 has twelve fixed contacts and a rotational dial capable of contacting one of these at a time to complete the circuit through this switch. This is interconnected through a plug P2 and a second plug P3 to the two-revolution-per-day clock 169. This clock has electrical contacts at each of the hour intervals, and has a sweeping electrical contact arm contacting one of these at each hour to be capable of completing a circuit through it. Presetting of the program clock by the desk clerk with switches SW1 and SW2 enables the guest in a particular room to be awakened at any selected time. Since switches SW1 and SW2 are found on each module, each room can be individually pre-set Assuming, for example, that switch SW1 is placed at one o'clock, and that switch SW2 is placed at 15 minutes on the a.m. side of the switch dial, the circuit will be completed at 1:15 a.m. to cause a signal to flow. This occurs by completion of the circuit from transformer 131, through lead 173, the sweep arm of clock 169, to the electrical contact at position 1, through plug P2, to the electrical contact on switch SW1, from thence to lead 165, through relay coil K3, through lead 163 and rectifier 161, through the 15 minute contact of switch SW2 on the a.m. side, thence through lead 181 and the contact of switch assembly 139, through the sweep arm of this switch assembly to the a.m. semi-circular contact of assembly 137, through its sweep arm and lead 145, and momentarily through contact switch assembly 135 as it closes for its two second interval. This causes a two second impulse through the coil of relay K3 to actuate contacts 201 of this relay. These closed contacts complete a circuit from transformer 130 through lead 207, down through lead 209, through plug P4 and specifically contact 8 thereof, through room buzzer 172 and indicator light L7, back through contact 1 of plug P4 up lead 211 through the rectifier 213, into lead 205, through the closed relay contacts 201, to lead 203, and back to the opposite side of transformer 130. The guest should be awakened therefore by his light L7 and buzzer 172.

As soon as he does awaken, he presses the release button for switch SW5 in his room panel to close a circuit reversing the current through relay K3. This reversal of current is caused by power flowing from transformer 131 to lead 219, contact 11 of plug P1, lead 221, down to contact 4 of plug P4, through switch SW5, through contact 2 of plug P4, through lead 225, up through rectifier 227, and to the relay coil of K3 in the reverse direction to open the relay contacts 201. This deactuates the buzzer and awakening light in the room.

If, on the other hand, the guest is not immediately awakened so as to release the mechanism by pushing the switch SW5, the desk clerk is automatically notified by closing of the time delay switch 182 with heating of its element. This causes current flow from lead 205 through indicator light L1 on the desk panel module, and thence through lead 207 back to the transformer. The clerk is then notified that the room occupant has not pressed the release button and can check into the matter personally or by telephone. Subsequent pressing of the switch SW5 will release this light and time delay switch also by opening of contacts 201.

Integrally associated with this awakening system is the fire detection system. It includes a switch-type heat detector 235 mounted in the room, but not necessarily in the room panel. This heat responsive switch is normally open, and is closed in response to heat, for example, as it is deformed. Upon closing of switch 235, power from transformer 130 flows through lead 251, through contact 7 of plug P4, through lead 253, through fire detector switch 235, through contact 10 of plug P4, through both the buzzer and awakening light in the room, and also to the fire indicating light L2 and corresponding buzzer in the desk panel module. More specifically, current flows through lead 255, through leads 257, through buzzer 259 and light L2 on the desk panel module, through lead 207 back to the opposite side of transformer 130. It also flows from lead 255 to lead 257', through rectifier 216, through leads 211 to actuate buzzer 172 and light L7 in the room, to lead 209, back to the opposite side of transformer 130. Current flowing through the room panel light and buzzer flows from transformer 130 to lead 207, through lead 209, through buzzer 172 and indicator light L7, through contact 1 of plug P4, lead 211, rectifier 261, lead 257', lead 255, fire detector switch 235, leads 253 and 251 back to the transformer. Current flowing through the desk panel indicator flows from lead 207 to light L2 and buzzer 259, thence to lead 257, lead 255, etc. back to the opposite side of transformer 130. Obviously, if the guest pushes the switch SW5 to deactuate the buzzer and light, it will not release this system. Furthermore, the desk clerk is notified of the fire situation in a particular room and can take appropriate action.

Control switch SW3 on each desk panel module allows the desk clerk to indicate to the guest that a message awaits him at the main desk. This is activated by rotating switch SW3 to complete the circuit. This causes power to flow from flasher 140 through lead 369, contact 12 of plug P1, lead 271, through rectifier 273, switch SW3, message indicator light L3 at the desk panel, leads 275, contact 5 of plug P4, message light L9 in the room, lead 277, contact 4 of plug P4, leads 279 and 221, then across contact 11 of plug P1, lead 219 to transformer 131. The message light at the desk and the room then both flash until the party in the room takes the message, at which time, the desk clerk switches switch SW3 back to its original position to deactivate this circuit.

A television warning system is also provided as an integral part of this system to indicate to the clerk when a television set is out of the room for repair, and also to indicate when a television set is being removed from the room in an unauthorized manner. This is achieved by connecting a power lead across the antenna leads of the television set. It is connected in the normal antenna plug under the plate mounted in the wall of the room. Therefore, the detector is not visible to the parties in the room. It is connected to the antenna co-axial cable conventionally used in hotels, and comprises one wire which passes through the cable, with the cable sheath forming a ground. A connection is made through a choke coil in the lead 291 to the antenna. This lead 291 is connected to a second lead 293 having a large resistor 490 of about 390 ohms and thence to lead 219 to transformer 131. Normally, indicator light L4 at the desk panel is not lit because the current therethrough is not sufficiently large due to the total resistance of the circuit. Under these normal conditions, when the television is connected in the room, current flows from transformer 131 through leads 219, contact 11 of plug P1, leads 221, 293 and the load resistor 490 and then divides into two branches, one branch comprising lead 291 and the television set 375 and the other branch comprising light L4, resistor 491, rectifier 273, lead 271, plug P1–12, lead 369, flasher 140, and lead 171. If then, the television antenna is cut by unauthorized removal of the set or by removal of the set for fixing, the first branch is broken and cut out of the circuit. Under these conditions, the current flowing through the remaining circuit comprising transformer 131, leads 219, plug P1–11, leads 221 and 293, resistor 490, light L4, rectifier 273, lead 271, plug P1–12, lead 369, flasher 140, and lead 171, is sufficient to illuminate light L4 causing it to flash. The flasher thus operates the light to cause it to flash intermittently in the particular module at the desk to warn the desk clerk of the condition. If the television is permanently removed for several days for repairs, the desk clerk can place a colored cover, purple for example, over the flashing light to tell him that the unit is removed for repair purposes. Then, whenever he spots a flashing light L4, he realizes that the set is just then being removed from the room.

Switch SW4 controls the indication of room status from the main desk. Assuming that a room is empty and cleaned, when an occupant checks in at the main desk, the room clerk turns the dial switch clockwise to the far right position so that it completes a circuit from the power supply and specifically contact 316 to contact 302 momentarily. The switch is spring biased so that when released it will snap back to contact 304 and release contact 302. Momentarily, however, power is applied so that current flows from lead 207 of transformer 130, through the coil of relay K2, through rectifier 306 and lead 308, to switch SW4 (including contacts 302 and 316), and back to the opposite side of the transformer. This activates relay contacts 310 to close them. Accordingly, power can then flow from transformer 130 to lead 203, down through lead 305 and contacts 310, through indicator light L6 on the module at the desk panel, through contact 6 of plug P1 and amber light L9 in the housekeeper's panel, through lead 313, contact 3 of plug P1, lead 315, contact 3 of plug P4, normally closed jack J2, and then through lead 209 and lead 207 back to the transformer. The housekeeper's panel and the desk panel, therefore, indicate that the room is occupied.

When an occupant is ready to leave, and the room will have to be cleaned up, the desk clerk rotates the switch SW4 in a counterclockwise direction to its extreme position so that it completes the circuit across contacts 312 and 316 momentarily. This causes current to flow temporarily from transformer 130 to lead 207 and the coil of relay K1, through rectifier 321 and contact 312, thence through the common contact 316 back to the transformer. Since the switch has a spring bias return from this contact to contact 314, the impulse is only momentary. However, the impulse is sufficient to close the contacts 323 of relay K1. This allows power to flow from transformer 130 to lead 203, lead 405, contact 316, contact 314, relay contact 323, light L5 on the desk panel indicator, contact 1 of plug P1, light L11 on the housekeeper's panel, lead 325, contact 2 of plug P1, lead 327, contact 6 of plug P4, through light L8 in the room panel, then back through lead 209 and lead 207 to the transformer again. The desk clerk and the housekeeper both are now informed that the room needs to be cleaned. Also, the light in the room indicates that it is the proper one. Therefore, when the maid is instructed by the housekeeper to clean this room, she can tell if she is entering the correct room by seeing if that light L8 is lit.

Upon entering the room, the maid takes the special plug 61 (FIG. 10) which she carries with her as on a key ring 63. It may include a resistor element 65. First, she plugs it in jack J1. This causes current reversal, with the current passing through the coil of relay K1 by flow through lead 251 from transformer 130, lead 253, jack J1 (now closed but normally open), rectifier 331, through coil of relay K1, lead 207, and back to the transformer. This opens contacts 323 to cause lights L5, L11, and L8 to go out. The maid then inserts her resistor jack plug 61 (FIG. 10) into jack J2 which is closed, to thereby cause current flow therethrough to be reduced due to the high resistance 65 of the jack. Consequently, lights L6 and L9, which are normally at full brightness, will be reduced to partial brightness to indicate to the housekeeper and the desk clerk that the maid is then working in that room. She leaves the plug in this jack while she is working in the room. Instead of the simple resistor, element 65 may be a heat responsive, normally closed switch to create a flashing light circuit of the one just described.

Upon completion of the cleaning process, the maid inserts her jack resistor into the normally open jack J3. This reverses the current temporarily through the coil of relay K2, by flow of current from transformer 130 to lead 251, lead 253, jack J3, lead 337, rectifier 339, coil of relay K2, lead 207 and back to the transformer. Since the lights on the housekeeper's panel and the desk panel go out, the clerk then knows that the room is ready to be occupied.

It is important to note that only when the jack plug is inserted in this last mentioned jack J3 do the "occupied" status lights on the housekeeper's panel and the desk clerk module go out. The desk clerk cannot do this at the desk. This has several advantages. Firstly, if luggage is still in the room, the maid does not use this jack J3, so that the occupied room status light will not go out. Further, this prevents the desk clerk from renting the room twice in one night, unless someone actually goes to the room to check it after the first rental to make sure it is in proper condition. For example, guests sometimes disapprove of a room after seeing it and want another. The desk clerk has meanwhile turned the occupied status switch. Before he rents the abandoned room again, however, someone must go to the room to activate jack J3, and then can check to see if the toilet has been used, the TV is in the room and in proper condition, etc. before the next guest enters.

Also, the awakening system has a similar safeguard, in that the time delay signal to the desk clerk caused by failure of the guest to depress switch SW5 cannot be deactuated by the desk clerk. It must be done from the room by using switch SW5. Thus someone must actually go to the room and check the guest to see the difficulty.

If a particular room should need immediate cleaning, for example, if an occupant wishes to have a business conference in his room, he notifies the desk clerk who, instead of allowing the switch SW4 to remain on contact 314, rotates it to the next common contact 316. This completes a flashing circuit from flasher 140 through lead 351, contact 10 of plug P1, lead 353, to contact 314, through the contacts 323 of relay K1, light L5 and light L11, lead 325, lead 327, light L8, lead 209, lead 207, transformer 130, lead 203, lead 305, across switch SW4 (including contacts 300 and 400), line 269, plug P1–9, and line 269*a* as previously. However, the lights now are operated solely from the flasher circuit and the light blinks to indicate that immediate action is desired. After the maid cleans the room, she utilizes her resistor jack in the manner described above.

Figure 1:
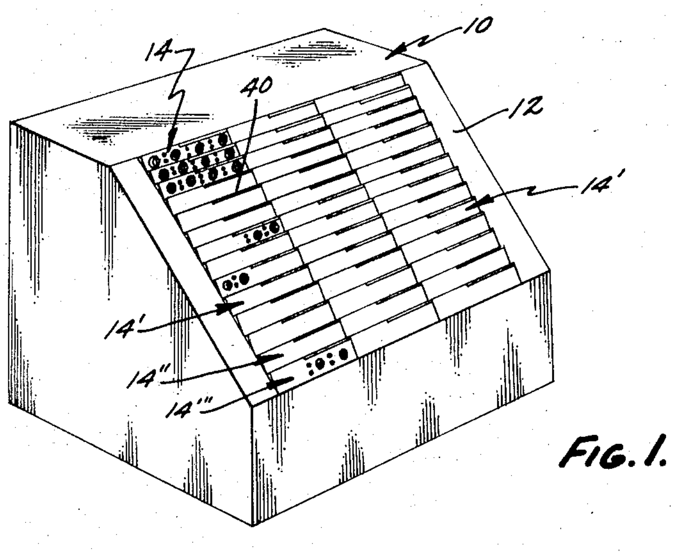
FIG. 1 is a perspective view of the console of modules at the main desk.

Not only are the individual self-contained modules interchangeable in the novel system, but the system also enables the selection of only part of the integrated components for a particular installation. For example, only the wake-up system may be utilized, with the last two switches and corresponding lights being left off the modules, as unit 14′ shown for convenience in FIG. 1. Another variation of the system may employ the awakening features combined with the room status features as shown by module 14″ in FIG. 1. Still another variation arises with the use of just the room status features as in module 14‴ in FIG. 1. In all of these variations, only the modules are ordinarily changed. They do not have the internal components and appropriate plug connections in the back for the eliminated features. At any time in the future, therefore, the proprietor can install the more elaborate system by merely substituting the more complex modules for the simpler ones.

This substitution can take place from the simplest module having no electrical components at all and merely forming an excellent card file to the most complex and elaborate models shown. The change can be gradual, moreover, from the blank module, to one with only a status system, to one with an awakening system, etc., as the proprietor sees fit, and all with no change in the over-all system.

The resulting system presents excellent and non-verbal communication. Due to the non-verbal aspects, no speakers are in the room to be subject to "tapping." Further, two people's time is not required just to transmit a message. Additional related advantages will also occur.

It is also conceivable that other certain minor details of structure and/or circuitry may be made of the preferred form illustrated without departing from the inventive concepts taught. Therefore, this invention is only to be limited by the attached claims and their reasonable equivalents.

I claim:

1. In a signaling control system for a hostelry from the main desk to the individual rooms, a plurality of signal means in the rooms; a plurality of individual modules at the desk each associated with one of the signal means for the respective rooms; said modules each having a separate housing containing a multipilicity of signal controls and illuminating signal indicators; a retaining casing receiving said housings in interfitted relationship to form a console; sliding electrical plug connections between each module housing and said casing; said plurality of control switches and illuminating signal indicators being mounted on the exposed face of each module housing forming a compact console frontal assembly of switches and indicators for convenient control of the system.

2. In a signaling control system for a hostelry from the main desk to the individual rooms, a plurality of signal means in the rooms; a plurality of individual signaling control modules at the desk each associated with one of the signal means for the respective rooms; said modules each having a separate housing containing a multiplicity of signal controls and illuminating signal indicators; a retaining casing receiving said housings in interfitted relationshp to form a console; sliding electrical plug connections between each module housing and said casing; said plurality of control switches and illuminating signal indicators being mounted on the face of each module housing forming a compact console frontal assembly of switches and indicators for convenient control of the system; each of said housings being elongated front to back and of generally rectangular cross-sectional configuration; said housings being mutually supporting when interfitted in said casing upper surface to lower surface; and the adjacent surfaces of adjacent housings being configurated to form elongated card receiving slots therebetween for individual room data cards.

3. The system in claim 2 wherein said surfaces include deformed stop portions in said slots to limit card insertion.

4. In a control system for a hostelry, a plurality of room panels containing separate signaling means in separate rooms and electrical wiring thereto and a plurality of controlling modules at a central location each associated with one of the signaling means; each of said modules being incorporated in a separate housing having generally flat upper and lower surfaces and containing independent electrical power supply means and a multiplicity of control switching means and illuminating signal indicators for the particular module; a casing receiving said module housings one above the other in mutual supporting fashion, with the lower surface of one module housing resting on the upper surface of the housing therebeneath and with the control switching means and illuminating signal indicators mounted on an exposed face of each module housing forming a compact control console frontal assembly of switches and indicators for convenient control of the system, and said individual housing being physically removable and electrically disconnectable from said casing for easy substitution thereof.

5. The system in claim 4 wherein one of said upper and lower surfaces of each modular housing is recessed to form and elongated card receiving slot adjacent each module when said housings are interfitted to form said console.

6. The system of claim 7 wherein said casing has an open front for receiving said modules, said open front being oriented on an upward backward slope; said casing including a stepped abutment and electrical connector panel means therein for abutting and connecting with the inner ends of said modules; and said modules fitting in said casing in a stepped fashion with inner ends in abutment with said stepped abutment panel means and electrically connected therewith, allowing convenient access, replacement, and display characteristics for said modules.

7. The system in claim 6 wherein said modules all slope downwardly and inwardly into said casing in a manner to provide a slightly tilted, generally vertical orientation to said card slots for visual display of cards in said slots.

8. The system in claim 4 wherein said control switching means and illuminating signal indicators include a set of time setting rotary switches for awakening and a time delayed awakening signal light, and include a room status switch and light indicators for control and indication of room cleaning and occupancy signals.

9. In a hostelry control system comprising a plurality of room panels containing signaling means in separate rooms and electrical wiring thereto and a plurality of controlling modules at a central location; each of said modules being incorporated in a separate housing having generally flat upper and lower surfaces and containing independent electrical power supply means and control switching means for the particular module; a casing receiving said module housings one above the other in mutual supporting fashion, with the lower surface of one module housing resting on the upper surface of the housing therebeneath to form a compact control console, and said individual housings being physically removable and electrically disconnectable from said casing for easy substitution thereof the improvement comprising wherein said casing has an open front for receiving said modules, said open front being oriented on an upward backward slope; said casing including a stepped abutment and electrical connector panel means therein for abutting and connecting with the inner ends of said modules; and said modules fitting in said casing in a stepped fashion with inner ends in abutment with said stepped abutment panel means and electrically connected therewith, allowing convenient access, replacement, and display characteristics for said modules.

10. The system in claim 9 wherein said modules will slope downwardly and inwardly into said casing in a manner to provide a slightly tilted, generally vertical orientation to said card slots for visual display of cards in said slots.

References Cited

UNITED STATES PATENTS

| | | | |
|---|---|---|---|
| 919,377 | 4/1909 | Pickel | 340—309.5 |
| 951,148 | 3/1910 | Ragan | 340—309.2 X |
| 1,269,856 | 6/1918 | Rendle | 340—313 |
| 1,327,837 | 1/1920 | Muschenhiem | 340—286 |
| 1,370,059 | 3/1921 | Smith | 340—309.4 |
| 1,390,907 | 9/1921 | Heyroth | 340—309.5 X |
| 2,267,812 | 12/1941 | Bryee | 340—309.4 X |
| 2,438,271 | 3/1948 | Marholz | 317—210 X |
| 3,137,212 | 6/1964 | Rose | 317—120 X |
| 3,215,999 | 11/1965 | Dawson | 340—309.4 |
| 3,218,518 | 11/1965 | Ashbridge | 317—120 X |
| 3,255,330 | 6/1966 | MacKenzie et al. | 317—99 |

FOREIGN PATENTS

| | | |
|---|---|---|
| 15,804 | 6/1912 | Great Britain. |

NEIL C. READ, *Primary Examiner.*

I. J. LEVIN, R. M. GOLDMAN, *Assistant Examiners.*

UNITED STATES PATENT OFFICE
CERTIFICATE OF CORRECTION

Patent No. 3,353,173 November 14, 1967

Freeman C. Beilfuss

It is certified that error appears in the above identified patent and that said Letters Patent are hereby corrected as shown below:

Column 1, line 43, "ths" should read -- this --. Column 3, line 73, cancel "end". Column 10, line 48, "of claim 7" should read -- of claim 4 --.

Signed and sealed this 19th day of August 1969.

(SEAL)
Attest:

Edward M. Fletcher, Jr.
Attesting Officer

WILLIAM E. SCHUYLER, JR.
Commissioner of Patents